United States Patent [19]

Hennemann

[11] 3,942,857

[45] Mar. 9, 1976

[54] DEVICE FOR ASSEMBLING AND FIXING ELECTRICAL CONTROL PANEL EQUIPMENT

[75] Inventor: Jean Hennemann, Homblieres, France

[73] Assignee: UNELEC, Paris, France

[22] Filed: June 17, 1974

[21] Appl. No.: 480,446

[30] Foreign Application Priority Data
June 15, 1973 France .............................. 73.21952

[52] U.S. Cl. ...... 339/75 R; 339/125 R; 339/198 GA
[51] Int. Cl.[2] .......................................... H01R 13/54
[58] Field of Search ............... 339/75, 91, 125, 198; 317/117–119

[56] References Cited
UNITED STATES PATENTS

| | | | |
|---|---|---|---|
| 3,093,773 | 6/1963 | Cole | 339/91 R |
| 3,382,416 | 5/1968 | Jacobs et al. | 317/119 |
| 3,483,434 | 12/1969 | Koertge | 317/119 |
| 3,491,268 | 1/1970 | Christensen et al. | 317/119 |

FOREIGN PATENTS OR APPLICATIONS

| | | | |
|---|---|---|---|
| 1,232,237 | 3/1961 | Germany | 339/198 GA |
| 947,001 | 8/1956 | Germany | 317/119 |

*Primary Examiner*—Joseph H. McGlynn
*Attorney, Agent, or Firm*—Sughrue, Rothwell, Mion, Zinn & Macpeak

[57] ABSTRACT

A device is disclosed for mounting an electrical apparatus on standard channel iron comprising a stand portion, a mechanical gripping portion and an electrical contact portion. One edge of the channel iron is engaged by a notch in said stand portion while the opposite edge is engaged between the stand portion and one end of the mechanical gripping portion.

The other end of the mechanical gripping portion engages the electrical apparatus and serves to correctly position such apparatus. The electrical contact portion is inserted into a corresponding connector in the electrical apparatus.

8 Claims, 3 Drawing Figures

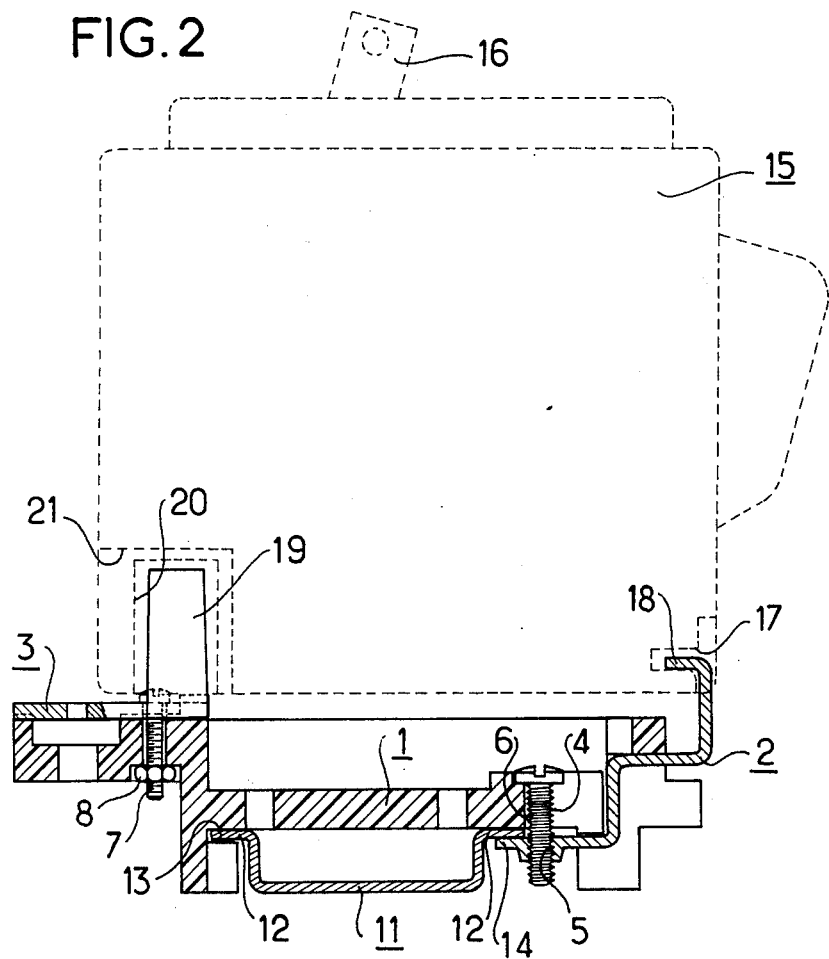
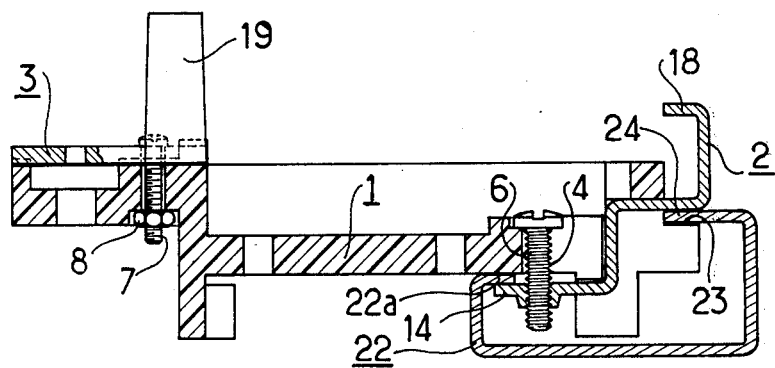

DEVICE FOR ASSEMBLING AND FIXING ELECTRICAL CONTROL PANEL EQUIPMENT

FIELD OF INVENTION

The present invention concerns a device for fixing control panel equipment on standard section irons or ledges and comprising, inserted between them, an insulating support provided with a mechanical part and an electrical contact. It relates more particularly to the structure of that intermediate support and to the related parts constituting the device and aiming at enabling more particularly the installing of the latter on one or the other of the section irons of at least two standard types.

DESCRIPTION OF PRIOR ART

Devices known and used up till now make use either of the insertion of fast-installing parts, in the stand or housing of the equipment which must be designed for that purpose, or of special section irons more particularly provided with hooks for effecting the appropriate installing operations. To simplify the devices having integrated installing parts in the equipment, the use of a locking latch which pivots and is built onto the said equipment which may then be directly arranged on the section iron at the required place has been proposed; but the controlling of the pivoting complicates the original simplicity and, in any case, always entails the use of special equipment suited to the said latch.

SUMMARY OF THE INVENTION

The object of the present invention is to take advantage of the versatility of use afforded by an intermediate part independent from the two elements to be joined together and between which it is inserted. The use both of standard section irons of the most current types and of equipment having also standard dimensions and installing means, that is, mass-produced parts which may be manufactured in economical series and which are suitable for wide commercial distribution, instead and in place of special parts in strictly limited numbers and for strictly limited uses, which have a high cost, are more particularly referred to.

Moreover, one and the same type of device which is suitable for the assembling of parts of several types makes it possible to produce greater series of the said devices and to simplify the stocking thereof since this is a unique type instead of several types to be kept in stock.

The essential feature of the invention resides in the fact that the mechanical part connected with the inserted stand plays a part simultaneously in the fixing by clamping of the stand optionally on any one of the standard section irons provided and in the installing, by pivoting, of the equipment on the said stand.

DESCRIPTION OF THE DRAWINGS

The invention is also extended to the characteristics resulting from an embodiment described hereinafter, having no limiting character, in order better to explain the object and with reference to the drawing, in which:

FIG. 2 shows a transversal cross-section view of the device in FIG. 1, installed on a section iron of a standard type;

FIG. 3 shows a cross-section view similar to that in FIG. 2 of the same device installed on a section iron of another standard type.

DESCRIPTION OF PREFERRED EMBODIMENT

Figure 1:
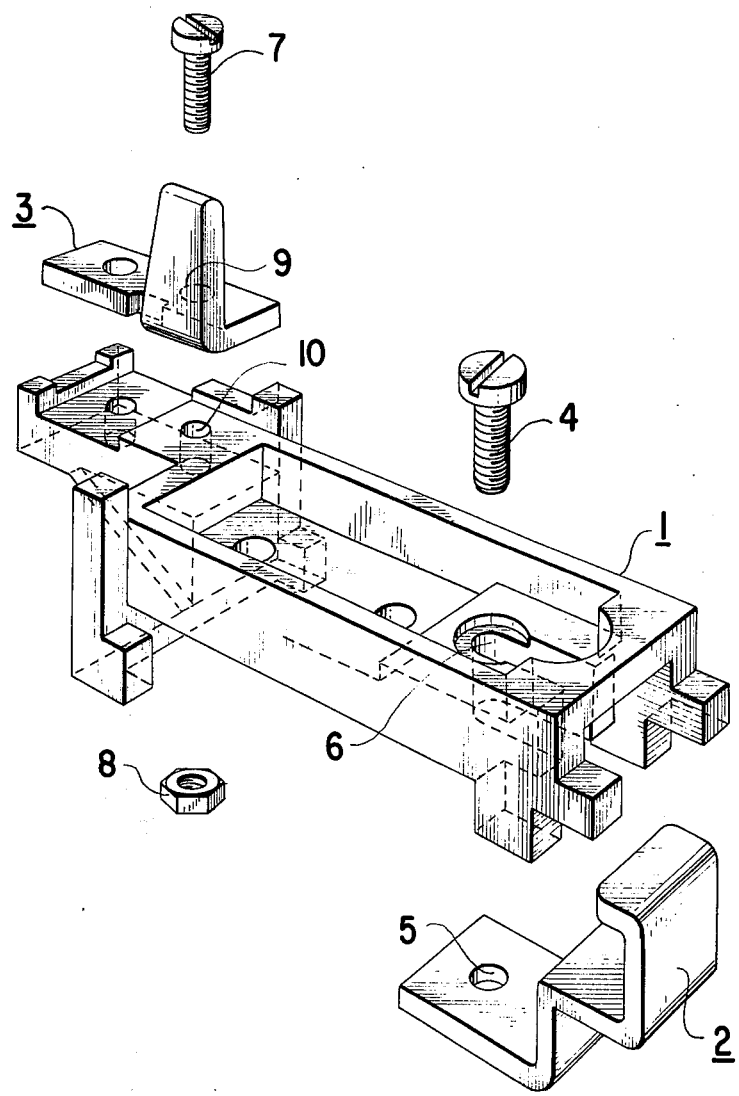
FIG. 1 is an exploded perspective view of the installing device according to the invention.

As shown in FIG. 1, a mechanical part 2 and an electrical contact 3 are installed at and connected to the two ends of the stand 1. The mechanical part 2 is fixed to the stand 1 by means of a screw 4 passing through the hollow part 6 of said stand 1 and screwing into the tapped hole 5 of the mechanical part 2 whose plane portion containing the said hole 5 is applied under the stand 1. The contact 3 is fixed to the stand 1 by means of a screw 7, crossing through the said contact 3 by means of the hole 9, and the said stand 1 by means of the hole 10 and being screwed into the nut 8.

As seen in FIG. 2, the stand 1, made of insulating material, is fixed on the standard section iron 11 having symetrical flanges 12. To arrange the stand on the section iron, the screw 4 being partly screwed in, the mechanical part 2 is pushed back towards the right, as seen in FIG. 1 until the screw 4 bears against the right-hand side of the hollow part 6.

The hollow part 13 of the stand 1 is then engaged on the left flange 12 of the section iron 11 and the mechanical part 2 is brought back towards the left, encircling the right wing of the section iron 11 between the stand 1 and the flat portion 14 of the said part 2. The stand 1 can then no longer release itself from the section iron 11 along which it may nevertheless slide freely as long as the screw 4 is not tightened.

When the stand 1 has been brought into the position provided on the section iron 11, the screw 4 then needs only to be tightened to obtain the holding in position of the device. The installing of the equipment 15, which has a manual control lever 16 then remains to be effected, positioning the hollow portion 17 of the housing of the equipment is in front of the flat portion 18 forming a curved back end of the part 2.

The flat portion 18 acts as an articulation hook for the equipment 15 in the hollow portion 17 of the housing of which it is inserted obliquely to avoid that blade 19 of the electrical contact 3; then, by a pivoting movement about the articulation 17, 18, the said blade 19 is plugged into the female contact 20 situated in the hollow portion 21 of the equipment 15.

In FIG. 3, the stand 1 is fixed onto a standard section iron 22 having an unsymetrical cross-section. One of the ends 22a of the section iron 22 is clamped between the stand 1 and the flat portion 14 of the mechanical part 2 in a like manner to that of the section iron 11 in FIG. 2. The other end of the section member 24, is recessed in the space 23 between a hollow portion of the stand 1 and a portion of the mechanical part 2. To arrange the stand on the section iron, the same method is used as that in the description relating to FIG. 2, considering that it is the space 23 which is engaged on the end 24 of the section iron 22 and that the mechanical part 2 is brought back towards the left, encircling the other end of the section iron between the stand 1 and the flat portion 14 of the said part 2.

It is self-evident that this device is interesting only because of the substantial progress and rapid development of the practice of standardization both in the branch of section irons for the fixing of the stand and in that of the measurements and dimensions of the electric plugs and of the fixing means for the equipment for the installing of the latter on the stand. The search for dimensional interchangeability and for assemblies making rapid changing easy, shows that the present invention is developing in the current direction of progress and of industrial applications whose effectiveness is no longer questioned.

It must be understood that the example shown has no exhaustive character. Thus, the producing of parts, such as the electrical contact or else the mechanical parts having two functions may be effected by any technological means other than that of the folding at present recommended. Likewise, the fixing of these parts on the stand may be effected by any other means than by the screws and nuts which have been described.

This invention is not limited to the embodiment described but comprises all variants corresponding to the general definition which has been given thereof and which defines the technical branch which the present application is intended to protect.

I claim:

1. A device for mounting electrical equipment on a channel iron having at least one lateral flange of varying shape and dimensions comprising:
   a. a stand portion of insulating material;
   b. a mechanical gripping part located adjacent a first end of said stand portion, said gripping part having a first portion to grip said electrical equipment and an integral, second portion to grip said channel iron;
   c. adjustable means to fasten said mechanical gripping part to said stand portion such that said mechanical gripping part is adjustable with respect to said stand portion and such that a portion of the lateral flange is engaged between the mechanical gripping part and the stand portion; and
   d. an electrical contact part affixed to said stand portion adjacent a second end of said stand portion such that said electrical contact part engages a corresponding electrical connector in said electrical equipment.

2. The mounting device of claim 1 wherein said adjustable fastening means comprises:
   a. a slot through said stand portion;
   b. a threaded hole through said mechanical gripping part; and
   c. a threaded fastener inserted through said slot and engaging said threaded hole.

3. The mounting device of claim 1 wherein said stand portion has a centrally located recessed portion.

4. The mounting device of claim 1 wherein said stand portion has a depending member, said depending member having a slot therein to engage one side of said channel iron.

5. The mounting device of claim 1 wherein said stand portion has a plurality of projection portions, projecting from said first end to engage one side of said channel iron.

6. The mounting device of claim 1 wherein said mechanical gripping part has the second end portion engaging one side of said channel iron and the first end portion engaging said electrical equipment.

7. The mounting device of claim 6 wherein said first and second end portions are located in parallel planes.

8. The mounting device of claim 7 wherein said first and second end portions are connected to a mid portion parallel to said first and second end portions, by two walls perpendicular to the planes of said first and second end portions.

* * * * *